United States Patent
Sheriff et al.

(10) Patent No.: US 10,904,805 B1
(45) Date of Patent: Jan. 26, 2021

(54) TRIGGERING CLIENT ROAMING IN A HIGH CO-CHANNEL INTERFERENCE ENVIRONMENT

(71) Applicant: Cisco Technology, Inc., San Jose, CA (US)

(72) Inventors: Akram Ismail Sheriff, San Jose, CA (US); Xiaoguang Jason Chen, San Jose, CA (US); Jun Liu, Shanghai (CN); Robert Edgar Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/659,630

(22) Filed: Oct. 22, 2019

(51) Int. Cl.
| | |
|---|---|
| *H04W 24/02* | (2009.01) |
| *H04W 36/00* | (2009.01) |
| *H04W 36/32* | (2009.01) |
| *H04W 36/38* | (2009.01) |
| *H04W 4/40* | (2018.01) |

(52) U.S. Cl.
CPC ....... *H04W 36/00837* (2018.08); *H04W 4/40* (2018.02); *H04W 36/32* (2013.01); *H04W 36/38* (2013.01)

(58) Field of Classification Search
None
See application file for complete search history.

(56) References Cited

U.S. PATENT DOCUMENTS

| | | | |
|---|---|---|---|
| 8,903,379 B2 | 12/2014 | Ceccherini et al. | |
| 9,526,058 B2 * | 12/2016 | Kakkad | H04W 36/30 |
| 9,877,251 B2 | 1/2018 | Stager et al. | |
| 1,019,430 A1 | 1/2019 | Lu et al. | |
| 1,028,510 A1 | 5/2019 | Kolar et al. | |
| 1,037,556 A1 | 8/2019 | Vasseur et al. | |
| 2013/0148641 A1 | 6/2013 | Sivaprakasam et al. | |

OTHER PUBLICATIONS

"Cisco Wireless Mesh Networking", Enterprise Mobility 8.5 Design Guide, Chapter 8, Aug. 19, 2018, 24 pages, Cisco Systems, Inc., San Jose, CA.
"Connecting the Cisco 1500 Series Mesh Access Points to the Network", Cisco Wireless Mesh Access Points, Design and Deployment Guide, Release 8.1 and 8.2, Jan. 26, 2018, 86 pages, Cisco Systems, Inc., San Jose, CA.

(Continued)

*Primary Examiner* — Ayanah S George
(74) *Attorney, Agent, or Firm* — Behmke Innovation Group; Kenneth J. Heywood; Jonathon P. Western (57) ABSTRACT

In one embodiment, a device in a wireless network receives telemetry data from a plurality of autonomous vehicles. The telemetry data is indicative of radio signal quality metrics experienced by the vehicles at a particular location over time. The device forms an array of wireless roaming thresholds by applying regression to the telemetry data. The device computes an optimum roaming threshold from the array of wireless roaming thresholds to be used by the vehicles when approaching the location. The device triggers, based on the computed optimum threshold, one or more of the autonomous vehicles to initiate access point roaming when approaching the particular location.

20 Claims, 8 Drawing Sheets

(56) References Cited

OTHER PUBLICATIONS

"Inter-Access Point Protocol", online: https://en.wikipedia.org/wiki/Inter-Access_Point_Protocol, May 15, 2018, 1 page, Wikimedia Foundation, Inc.

"WGB Roaming: Internal Details and Configuration", online: https://www.cisco.com/c/en/us/support/docs/wireless/aironet-1130-ag-series/113198-wgb-roam-config.html, Aug. 26, 2011, 11 pages, Cisco Systems, Inc.

* cited by examiner

TRIGGERING CLIENT ROAMING IN A HIGH CO-CHANNEL INTERFERENCE ENVIRONMENT

TECHNICAL FIELD

The present disclosure relates generally to computer networks, and, more particularly, to triggering client roaming in a high co-channel interference environment.

BACKGROUND

As wireless access points become increasingly ubiquitous, more and more access points are being deployed in industrial settings. Typically, this is done through the implementation of a wireless mesh, whereby access points relay communications between one another, in order to pass data to and from clients. This is in contrast to traditional enterprise wireless networks.

Unfortunately, triggering roaming between access points in certain wireless mesh deployments can be quite challenging. For example, hills, turns, and the like, can sometimes lead to 'dead spots' at which a client will lose its connection to the network, were it to say connected to its current access point. To complicate this even further, roaming decisions for fast-moving clients, such as vehicles, must be made in a very short amount of time. Effects such as co-channel interference, though, can create delays in coordinating these roaming decisions, leading to the client unavoidably losing its network connection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a wireless network receives telemetry data from a plurality of autonomous vehicles. The telemetry data is indicative of radio signal quality metrics experienced by the vehicles at a particular location over time. The device forms an array of wireless roaming thresholds by applying regression to the telemetry data. The device computes an optimum roaming threshold from the array of wireless roaming thresholds to be used by the vehicles when approaching the location. The device triggers, based on the computed optimum threshold, one or more of the autonomous vehicles to initiate access point roaming when approaching the particular location.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
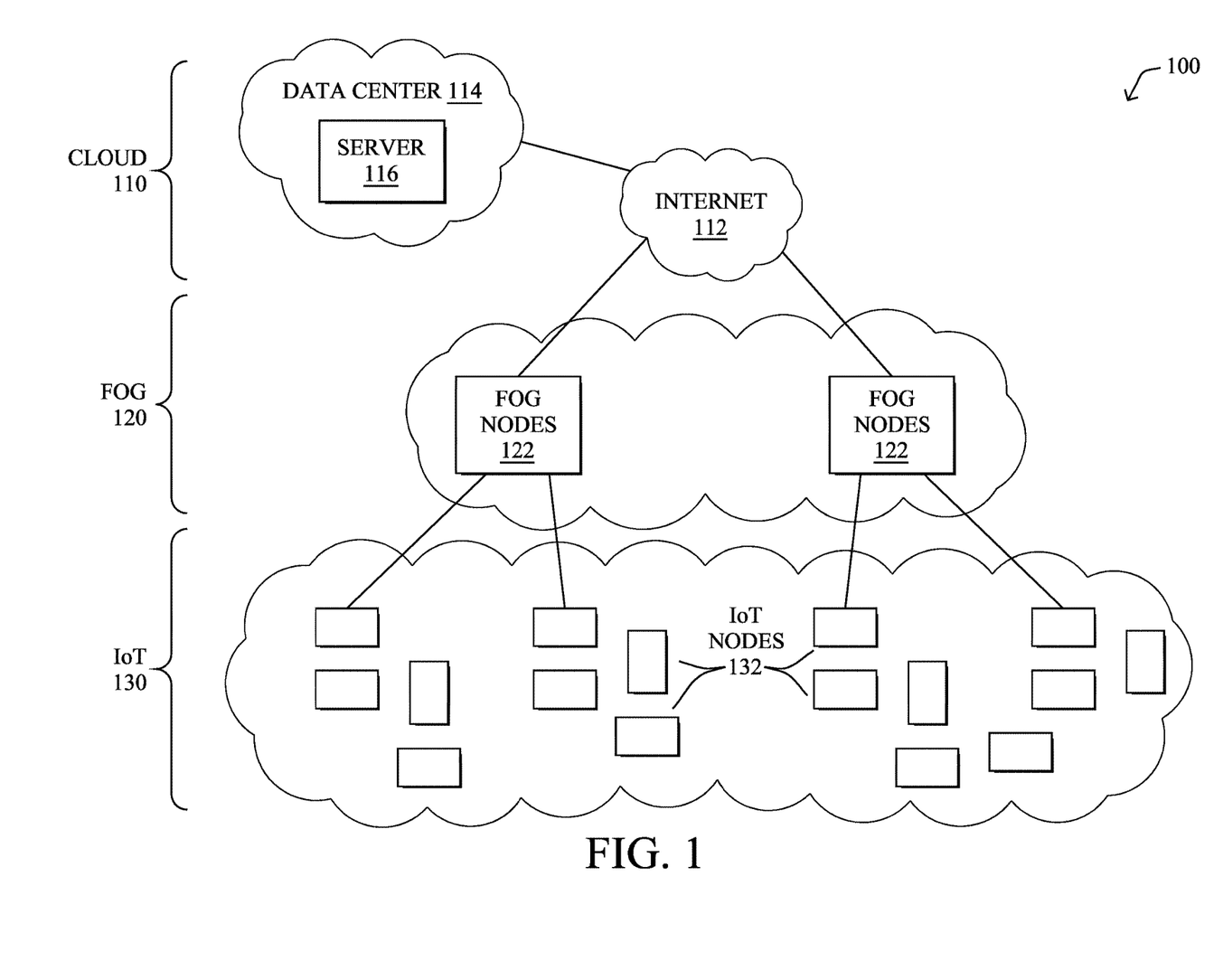
FIG. 1 illustrate an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
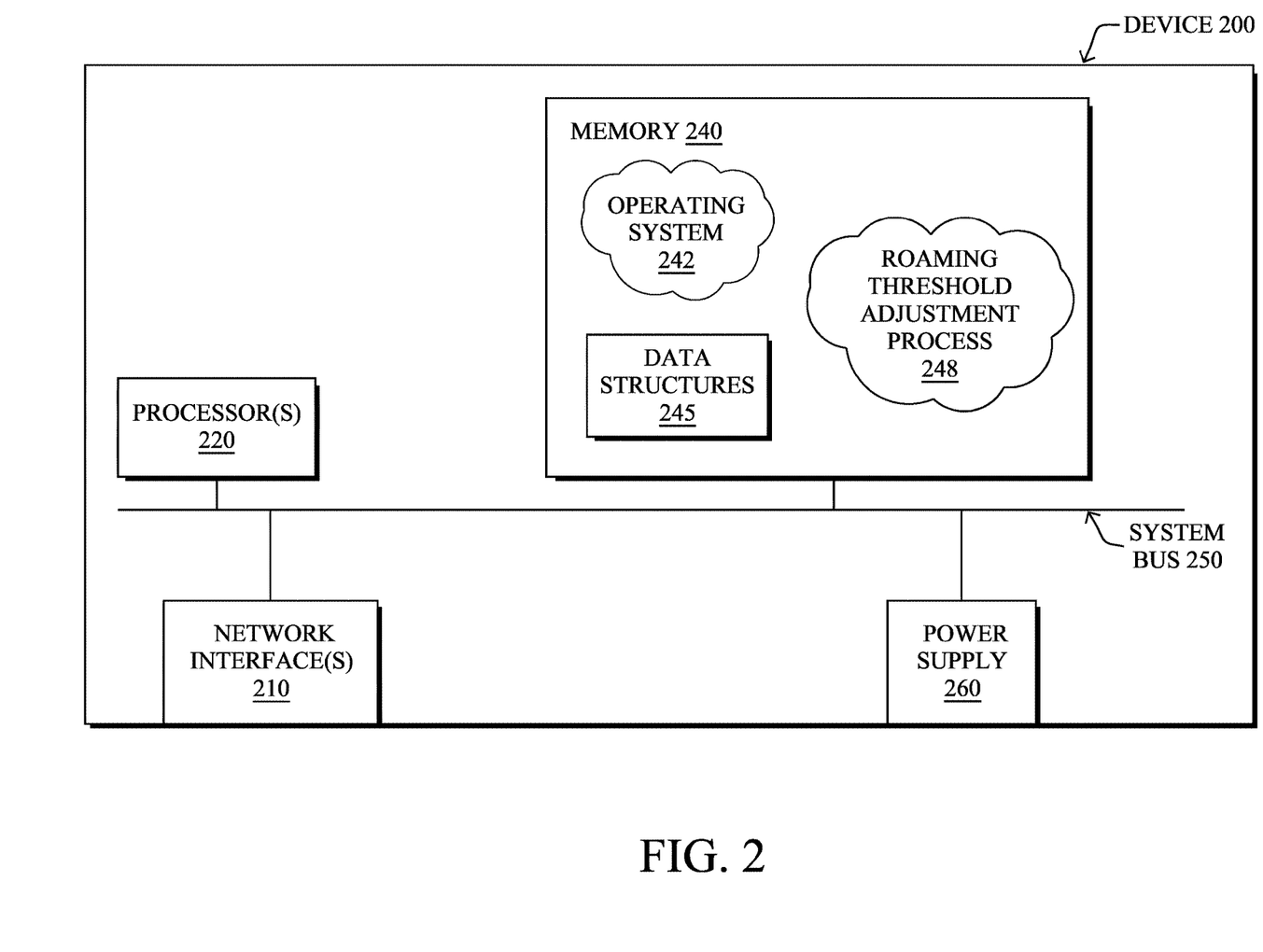
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative roaming threshold adjustment process 248, as described herein. Note that while process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

During execution, roaming threshold adjustment process 248 may adaptively determine a roaming threshold used to determine whether a device in a wireless network should roam to another wireless access point in the network. As used herein, 'roaming' refers to the process whereby a client switches from one access point in a wireless network to another access point of that network. Typically, this is triggered when the signal quality for the current access point crosses a defined roaming threshold, thereby causing the client to seek out another access point to which it will attach. This is often due to the client moving throughout the physical location of the wireless network. For example, as the client moves away from its current access point, the received signal strength for its current access point will decrease while simultaneously increasing for another access point. Once the signal strength for its current access point crosses its defined roaming threshold, the client will switch to using the other access point, instead.

In various embodiments, roaming threshold adjustment process 248 may dynamically compute and adjust the roaming threshold for a client by utilizing machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, roaming threshold adjustment process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that has been labeled as indicative of an acceptable connection with an access point. On the other end of the spectrum are unsupervised techniques that do not require a training set of labels. Notably, while a supervised learning model may look for previously seen patterns that have been labeled as such, an unsupervised model may instead look to the underlying behavior of the data, such as how sets of telemetry data are inter-related and/or change over time. Semi-supervised learning models take a middle ground approach that uses a greatly reduced set of labeled training data.

Example machine learning techniques that roaming threshold adjustment process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression techniques, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

As noted above, IoT networks are implemented as wireless meshes. To extend wireless mesh connectivity to hardwired devices, the hardwired devices may leverage an access point bridge, such as a Workgroup Bridge (WGB) from Cisco Systems, Inc. In general, an access point bridge is a standalone unit that connects a hardwired network to the wireless mesh by communicating with another access point of the wireless network.

Figure 3:
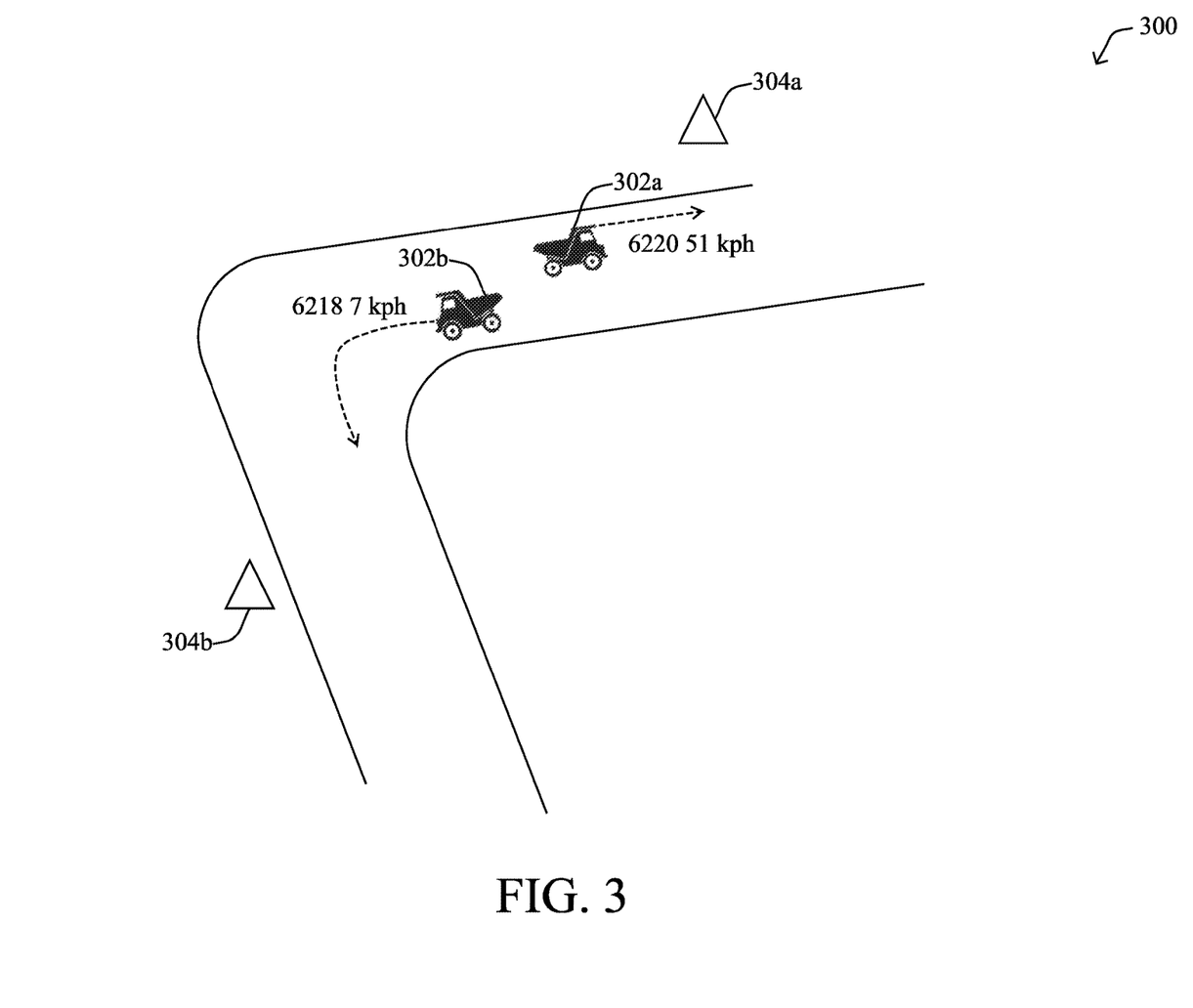
FIG. 3 illustrates an example industrial setting in which a wireless mesh network is located.

By way of example of connecting hardwired devices to a wireless mesh network, consider the case illustrated in FIG. 3. As shown, a number of autonomous vehicles 302a-302b may be deployed in an industrial setting 300. For example, if industrial setting 300 is a mine, autonomous vehicles 302a-302b may be autonomous trucks or carts. Each of autonomous vehicles 302a-302b may include its own hardwired network, such as a Controller Area Network (CAN) Bus, Ethernet, or the like, that allow the various components of the vehicle to communicate with one another. For example, a plurality of sensors on vehicle 302a may send sensor readings to an onboard navigation system that controls the steering and acceleration of vehicle 302a within industrial setting 300 via a local hardwired network of vehicle 302a.

Distributed throughout industrial setting 300 may be any number of wireless access points 304, such as wireless access points 304a-304b, that form a wireless mesh network. In some embodiments, the access points 304 may be autonomous access points that self-organize into a wireless mesh.

For example, certain access points 304 may function as mesh access points (MAPs) and arrange themselves into a wireless mesh rooted at a root access point (RAP).

During operation, the access point bridge local to a vehicle 302 may attach to one of the access points 304 in the wireless mesh, allowing communications to be passed wirelessly to and from the vehicle 302 and between the bridge and the wired network of the vehicle 302. As a vehicle 302 travels within industrial setting 300, it may roam from access point 304 to access point 304, based the radio signal quality observed for those access points 304.

Typically, the decision to roam from the current access point 304 being used by a vehicle 302 to another access point 304 is made by comparing the radio signal quality metrics for the access points to one or more roaming thresholds. Notably, if the received signal strength indicator (RSSI), signal-to-noise (SNR) ratio, or the like, crosses the roaming threshold, the vehicle 302 may roam to another access point 304. For example, as vehicle 302b moves away from access point 304a, its measured RSSI with access point 304a may drop below the defined roaming threshold, leading vehicle 302b to roam to another access point 304, such as access point 304b.

Unlike many enterprise and outdoor mesh Wi-Fi deployments, where clients remain relatively stationary, vehicles 302 may be constantly moving at a moderate to high velocity. This can lead to problems in the roaming process, particularly if the bridge access point of the vehicle becomes a part of an overlapping basic service set (OBSS) that is congested, as it takes longer to trigger roaming. Even an extra two seconds in the roaming process can lead to an autonomous vehicle coming to a complete stop. In this specific scenario, when the bridge access point on the vehicle 302 moves to a physical location experiencing a higher OBSS %, existing 802.11 roaming triggers will not adapt fast enough for the following reasons under the various 802.11 standards:

1) 802.11k—Under 802.11k assisted roaming, clients sends requests for neighbor lists only after they associate with an access point that advertises a Radio Management (RM) Capability Information Element (IE) in a beacon. When the physical located in a location having a high OBSS percentage, the air time utilization is also high. Consequently, in a congested wireless network with many OBSSs, this additional air time for the neighbor requests to reach the access point before making a roaming decision would not be acceptable from an IoT application perspective.
2) 802.11r—802.11r eliminates the handshake overhead while roaming and thereby reduces the handoff times between APs. However, 802.11r also fails to account for the OBSS percentage. Further, the fast transition (FT) feature of 802.11r is not supported on Wi-Fi mesh access points. This severely limits the ability of a client to receive a roaming trigger at the correct time, when located in a high-OBSS area.
3) 802.11v—Network Assisted Roaming under 802.11v also cannot help to trigger client roaming at the correct time. Rather, 802.11v helps to save power on the client by using the directed multicast to unicast conversion option.

Triggering Client Roaming in a High Co-Channel Interference Environment

The techniques herein introduce a machine learning-based mechanism to trigger client roaming in a high co-channel interference environment. In some aspects, the techniques herein are able to adaptively adjust the threshold(s) used to initiate roaming in a wireless network, based on the telemetry data captured over time for a particular location. This allows a client, such as a fast-moving autonomous vehicle, to proactively roam to a new access point before encountering problems.

Illustratively, the techniques described herein may be performed by hardware, software, and/or firmware, such as in accordance with the roaming threshold adjustment process 248, which may include computer executable instructions executed by the processor 220 (or independent processor of interfaces 210) to perform functions relating to the techniques described herein.

Specifically, according to various embodiments, a device in a wireless network receives telemetry data from a plurality of autonomous vehicles. The telemetry data is indicative of radio signal quality metrics experienced by the vehicles at a particular location over time. The device forms an array of wireless roaming thresholds by applying regression to the telemetry data. The device computes an optimum roaming threshold from the array of wireless roaming thresholds to be used by the vehicles when approaching the location. The device triggers, based on the computed optimum threshold, one or more of the autonomous vehicles to initiate access point roaming when approaching the particular location.

Operationally, the techniques herein allow for wireless roaming decisions to be made in a timely manner, to support fast-moving clients in a high interference environment. By way of example, consider again industrial setting 300 shown in FIG. 3. As shown, each bridge access point onboard an autonomous vehicle 302 may collect telemetry data over time regarding the performance of the wireless network (e.g., signal quality), as well as the state of the vehicle. For example, the vehicle 302 may collect any or all of the following telemetry data:

Location information (e.g., coordinates)—this can be captured, for example, using an onboard GPS receiver that provides precision <X, Y> coordinates for the vehicle.

The velocity of the vehicle 302 (e.g., in m/s)—this can be captured using the onboard CAN Bus/telematics system of the vehicle and/or derived from the location information.

The acceleration of the vehicle 302—this can also be captured by the CAN Bus/telematics system of the vehicle and/or derived from the velocity or location information (e.g., by computing the change in velocity over time).

RSSI variation patterns between antennas at the same location (e.g., between antennas of the bridge access point on a vehicle 302). This is often seen in mining settings, such as when the vehicle 302 is on a steep incline or when turning a corner.

Signal-to-Noise (SNR) Ratio measurements

Co-channel interference-based weightage assignments for access points

Uplink packet error rate (PER)

Timestamp Data

Figure 4:
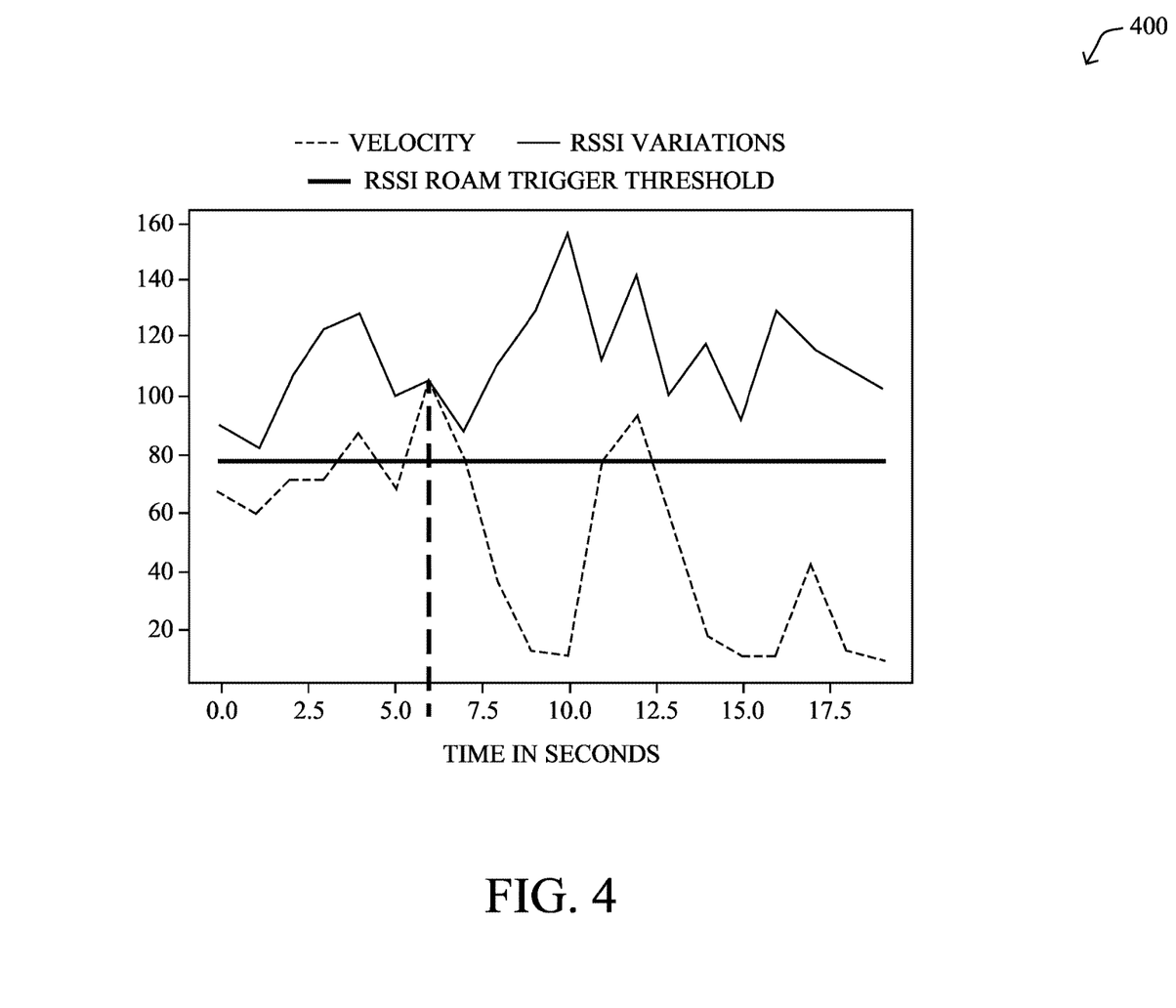
FIG. 4 illustrates an example plot of telemetry data and roaming threshold for a vehicle over time.

From the above telemetry data, machine learning can be leveraged to identify the optimum roaming time for a vehicle 302, to ensure that connectivity to the network is not lost. FIG. 4 illustrates an example plot 400 of the derivation of such a determination. As shown, the observed changes in the velocity of a vehicle 302 over time vis-à-vis the change in RSSI variations between antennas of the bridge access point of the vehicle over time. Equivalent Isotropically Radiated Power (EIRP) and Doppler Shift were also used to produce plot 400. The RSSI-based roaming trigger threshold for the vehicle 302 is also shown in plot 400.

From plot 400 and based on the RSSI variations and velocity of the vehicle that the optimum roaming time in this scenario is 6.2 seconds, which corresponds to the intersection of the lines in plot 400.

Figure 5:
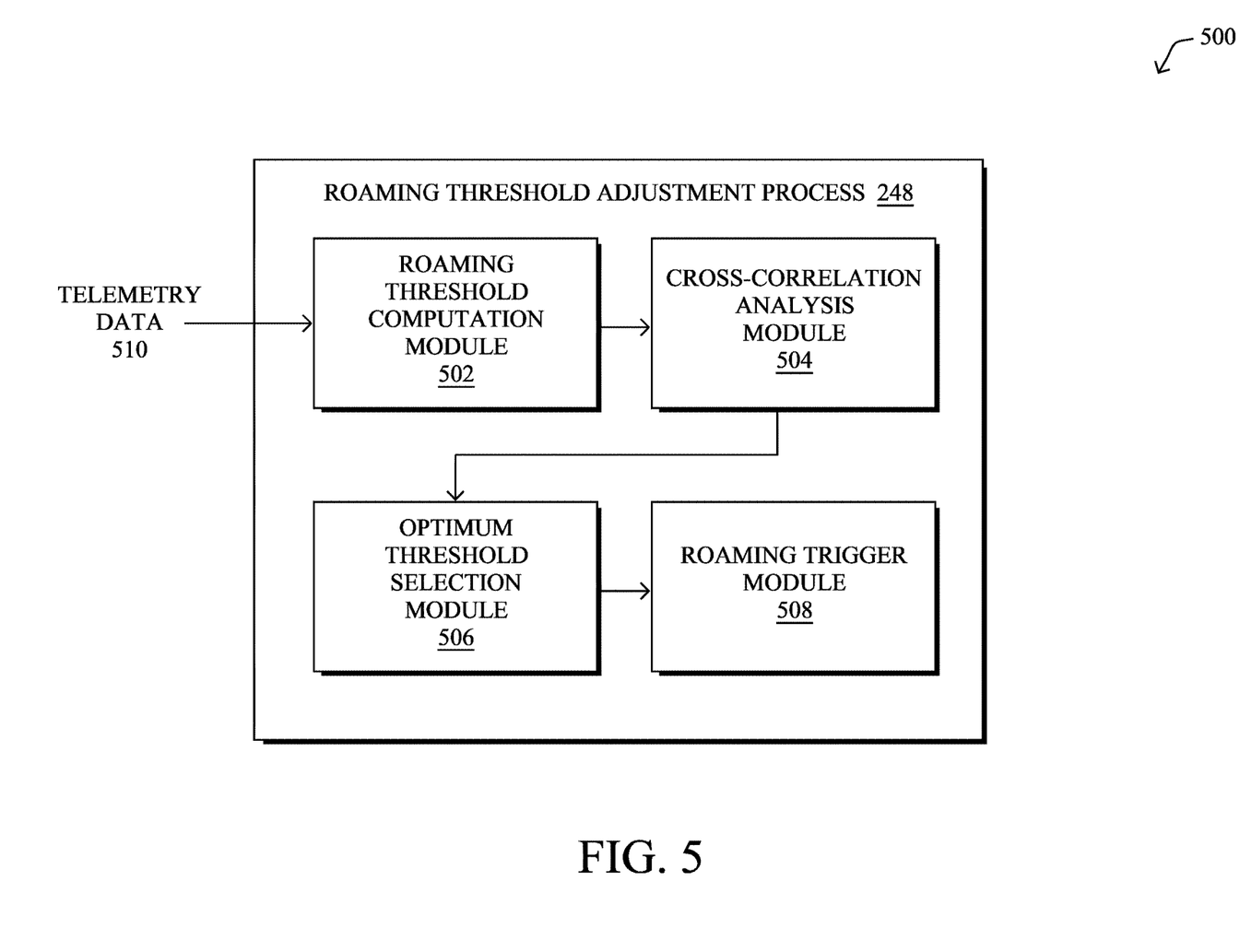
FIG. 5 illustrates an example architecture for optimizing the triggering of wireless roaming.

FIG. 5 illustrates an example architecture 500 for triggering wireless roaming in a network, according to various embodiments. At the core of architecture 500 is roaming threshold adjustment process 248 which may include any or all of the following components/modules: a threshold computation module 502, a cross-correlation analysis module 504, an optimum threshold selection module 506, and/or a roaming trigger module 508. As would be appreciated, these modules 502-508 may be implemented on the same device or, alternatively, on separate devices operating in conjunction with one another (e.g., in a distributed manner). In such a distributed case, the set of executing devices may be viewed as a single device for purposes of implementing architecture 500. Further, while these modules 502-508 are shown separately, their functionalities may be combined or omitted, as desired.

As noted above, most of the wireless roaming problems in an industrial setting, such as a mine, stem from the use of a static roaming trigger threshold. Such static thresholds (e.g., an RSSI threshold of 68 dbm) work well in enterprise wireless networks, but can lead to significant interruptions in connectivity in mines and other industrial settings. Thus, architecture 500 is configured to dynamically adjust the roaming threshold for a client based on the telemetry data 510 captured by any number of clients located in the area under consideration.

In various embodiments, the overall threshold adjustment process implemented by architecture 500 operates as follows:
1) Collect the telemetry data 510 from a client/vehicle as it traverses its path, to form a 2-dimensional list for the client/vehicle, for a single iteration (e.g., a single visit to the location, a specific time period, etc.).
2) Perform correlation analysis—assess the cross-correlation of the results of the first step across any number of different clients and iterations. If the resulting correlation matrix for a specific location <x, y> indicates a positive correlation, then:
3) Construct a 3-dimensional array using the 2-dimensional lists from n-number of clients/vehicles and their associated <X, Y> location coordinates as the third dimension.
4) Derive the Eigen values and Eigen vectors of the constructed 3-dimensional matrix/array.
5) Compute the mean of the eigen values along the first column of the 3-dimensional matrix/array, which has the RSSI values. This mean gives the optimum roaming threshold for the RSSI.

More specifically, roaming threshold adjustment process 248 may receive telemetry data 510 from any number of clients, bridge access points, and/or autonomous vehicles in the wireless mesh network and include any or all of the forms of telemetry data detailed previously regarding the signal quality that it experienced (e.g., RSSI, PER, SNR, etc.) and state (e.g., GPS location, velocity, etc.).

Figure 6:
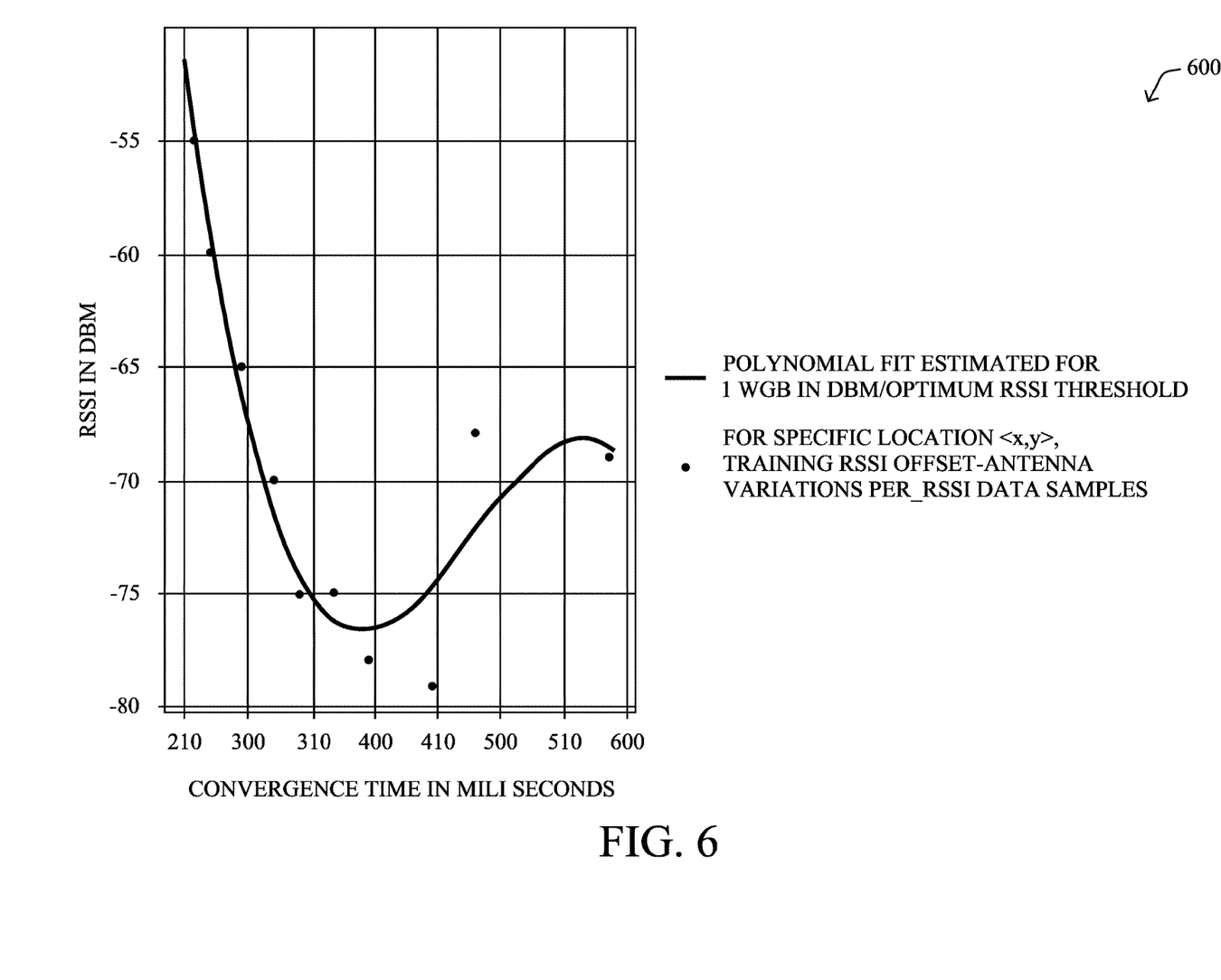
FIG. 6 illustrates an example plot of polynomial regression for determining an optimum roaming threshold value.

In turn, in various embodiments, roaming threshold computation module 502 may use a machine learning approach, such as multi-variable regression, to determine the optimum roaming trigger threshold, given the telemetry data 510 collected at a specific location <x, y> in the industrial setting. For example, FIG. 6 illustrates an example plot 600 in which polynomial regression is applied to the telemetry data 510 captured for a specific location <x, y>.

To better understand the operation of architecture 500, first assume that an autonomous vehicle repeatedly follows the same path in the industrial setting. Accordingly, telemetry data 510 may include N–1 iterations of telemetry data for any given location in the industrial setting (e.g., RSSI-antenna A, RSSI-antenna B, location <x, y>, etc.). In one embodiment, roaming threshold computation module 502 may apply multi-variable regression analysis on these N–1 historical telemetry data records, to derive a roaming threshold for a given location and/or time for a client/bridge access point/vehicle. Typically, such a threshold is an RSSI-based roaming threshold that, when crossed, triggers wireless roaming to occur. Roaming threshold computation module 502 may also apply the same logic to the iterations of telemetry data 510 from other clients, bridges, vehicles, etc., to derive their own roaming trigger values for that time and/or location.

As a result of the regression analysis by roaming threshold computation module 502 on the telemetry data 510 for a particular client, there will be n-number of roaming threshold values. These values can be grouped by module 502 to form an n-sized array of threshold values $[R_1, R_2, \ldots, R_n]$ at corresponding times $[T_1, T_2, \ldots, T_n]$ for location <x, y>. Note that the packet error ratio (PER) as experienced by the client/bridge/vehicle at that location <x, y> and for the times $[T_1, T_2, \ldots, T_n]$ is also another dependent variable that module 502 can also use to form the sequence PER=$[P_1, P_2, \ldots, P_n]$ from telemetry data 510.

In other words, through the regression analysis by roaming threshold computation module 502, module 502 may produce the following data arrays:

[R]=Roam_Trigger_Threshold=an N*M array, where 'N' is the number of R values derived for one client/bridge/vehicle and 'M' is the number of R values for other, different clients/bridges/vehicles that traverse the location under analysis.

[P]=PER_Observed=N*M array, where 'N' is the number of P values derived for one client/bridge/vehicle and 'M' is the number of P values derived for different clients/bridges/vehicles.

As would be appreciated by one skilled in the art of data science or machine learning, the column of the resulting data represents the significance of the features present in the data samples. In various embodiments, cross-correlation analysis module 504 may receive the Roam_Trigger_Threshold and PER_Observed arrays from roaming threshold computation module 502 and assess whether a cross-correlation pattern exists over time between the two arrays. In other words, if the two arrays are positively correlated, this means that there is a dependency between the two variables and the location is problematic for the clients/bridge access points/vehicles when located at the location. In such a case, an opportunity exists to adjust the roaming threshold used for that location.

When the two arrays are positively correlated, optimum threshold selection module 506 may compute an optimum roaming threshold for the location based on the [R] array, in various embodiments. To do so, in some embodiments, optimum threshold selection module 506 may compute the eigenvalues and eigenvectors for the Roam_Trigger_Threshold array, when cross-correlation analysis module 504 determines that the Roam_Trigger_Threshold and PER_Observed arrays are positively correlated. As would be appreciated, the eigenvalues and eigenvectors signify the intensity of the roaming threshold in a particular direction in the In some embodiments, optimum threshold selection module 506 may select the optimum roaming threshold as the mean of the computed eigenvalues of the Roam_Trigger_Threshold array. This computation can be repeated by architecture 500 any number of times, making the resulting threshold selected by module 506 an adaptive one that can be adjusted dynamically over time, as the conditions within the environment change.

From a physical standpoint, cross-correlation between the Roam_Trigger_Threshold and PER_Observed arrays implies that the location <x, y> where a client is traveling for the $N^{th}$ iteration of its telemetry data 510 with (N−1) prior samples of RSSI and PER correlation match consistently across all other clients (columns/features) as they move in that specific location, then that particular location is exhibiting some problem. For example, the location <x, y> may exhibit an RF coverage hole. Thus, proactively adjusting the roaming threshold in order to cause clients to proactively roam as they move to that location will prevent the clients from losing network connectivity at the location. In addition, the threshold selection process will result in an optimum amount of time needed in advance to trigger the roaming action.

Figure 7:
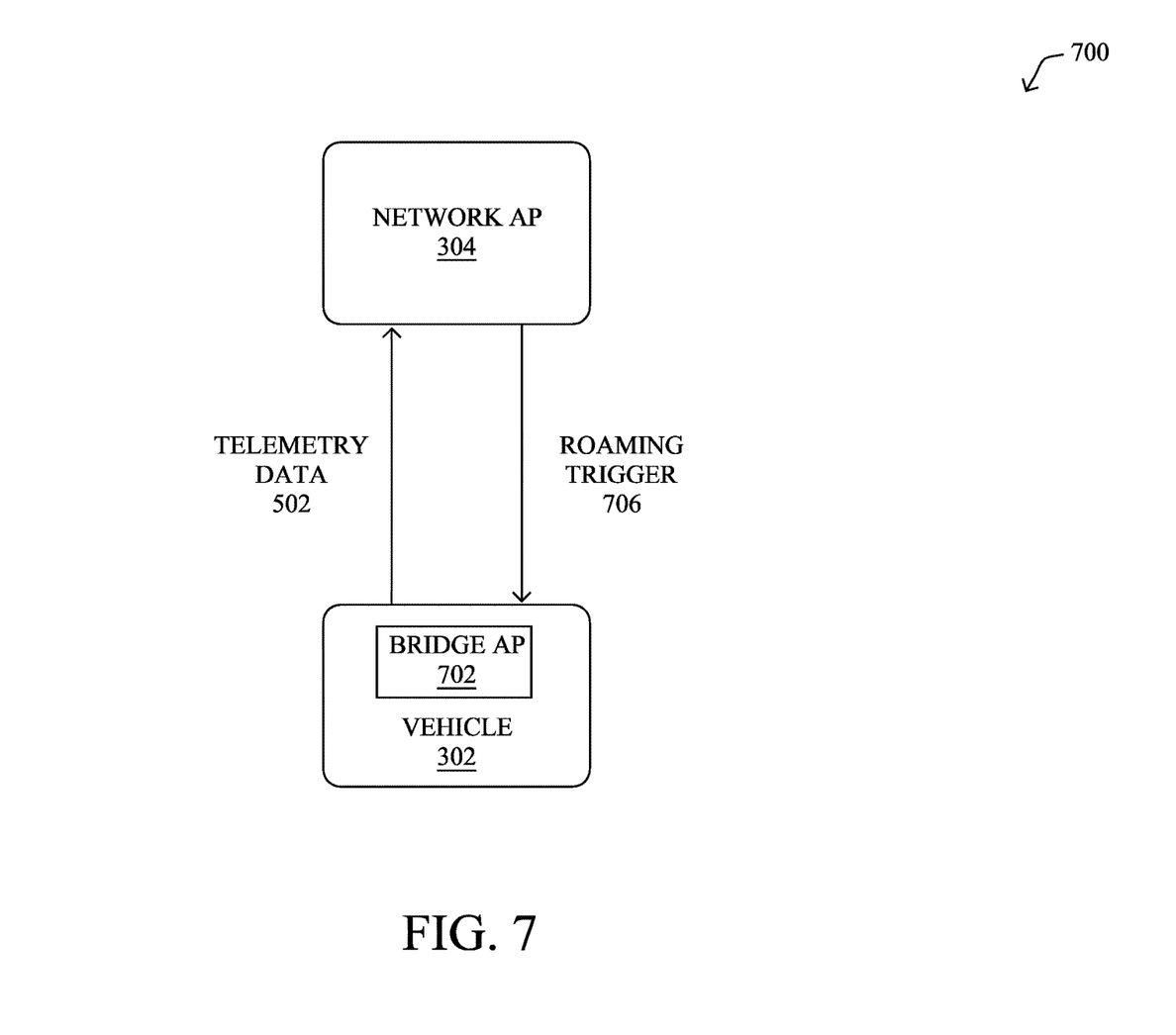
FIG. 7 illustrates an example of the triggering of wireless roaming in a network.

Using the threshold selected by optimum threshold selection module 506, roaming trigger module 508 may trigger clients to roam to a different access point as they approach the problematic location. FIG. 7 illustrates a simplified example 700 of the triggering of wireless roaming by roaming trigger module 508. As shown in example 700, assume that a vehicle 302 has an onboard bridge access point (AP) 702 that communicates with a particular network AP 304.

As vehicle 302 moves, bridge AP 702 may report the collected telemetry data 502 to its associated network AP 304. For example, bridge AP 702 may report telemetry data 502 to network AP 304 via an Inter-Access Point Protocol (IAPP) message or via another suitable protocol. In turn, network AP 304, or another device in communication therewith, may derive an optimum roaming threshold for vehicle 302 and use the threshold to trigger bridge AP 702 to roam to another network AP 304. To do so, network AP 304 may do so by sending a roaming trigger 706 to bridge AP 702. For example, roaming trigger 706 may be an 802.11v roaming trigger that causes bridge AP 702 to roam. Thus, bridge AP 702 may roam to a different AP, prior to arriving at a problematic location, and vehicle 302 will remain connected to the network.

Figure 8:
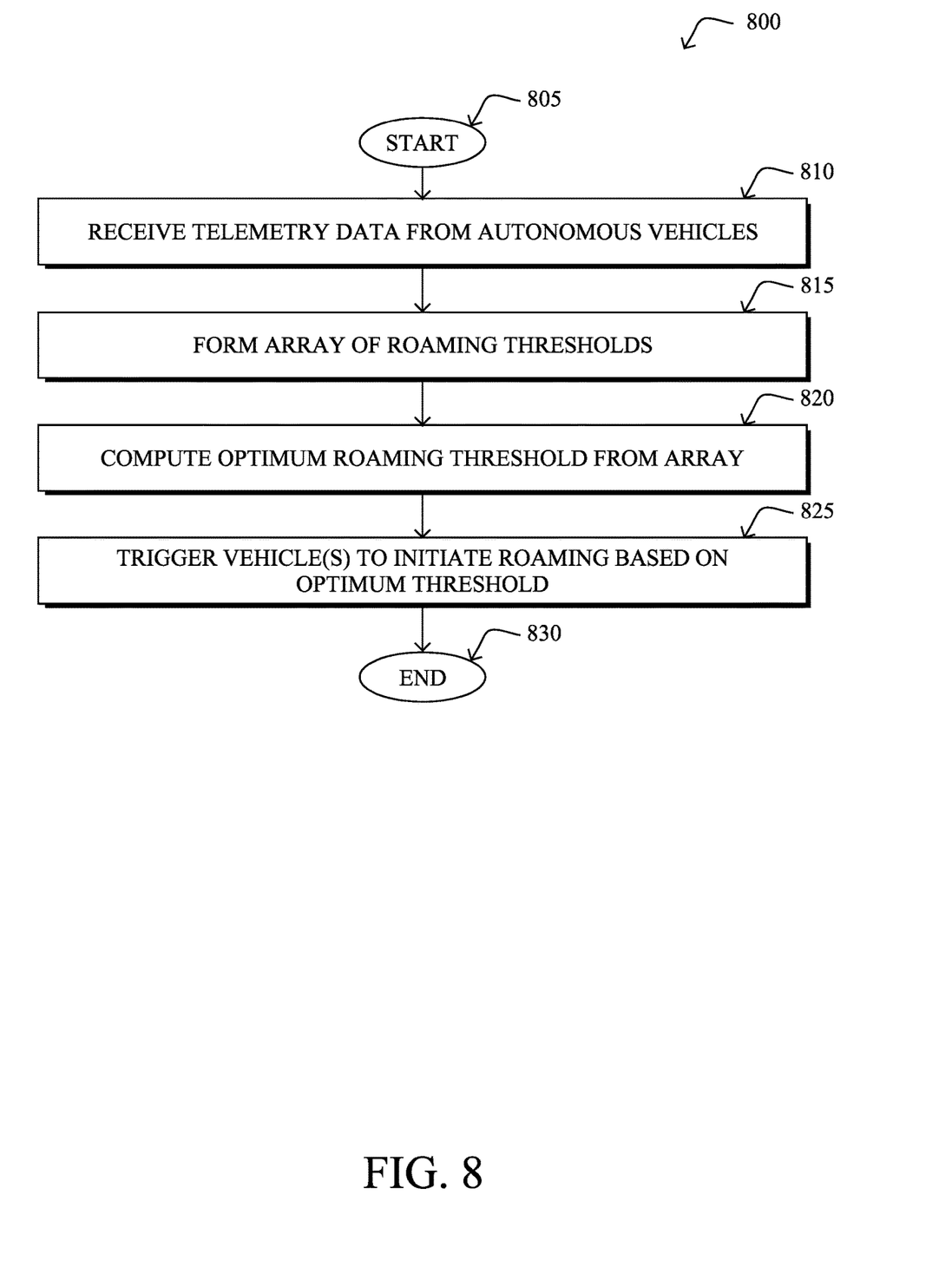
FIG. 8 illustrates an example simplified procedure for triggering roaming in a wireless network.

FIG. 8 illustrates an example simplified procedure for triggering roaming in a wireless network, in accordance with one or more embodiments described herein. The procedure 800 may start at step 805, and continues to step 810, where, as described in greater detail above, a device in a network (e.g., device 200), such as an autonomous wireless access point, may receive telemetry data from a plurality of autonomous vehicles. In general, the telemetry data is indicative of radio signal quality metrics experienced by the vehicles at a particular location over time. For example, the telemetry data may comprise a packet error rate (PER), a received signal strength indicator (RSSI), or a signal to noise ratio (SNR) taken by one of the vehicles at a particular location. In some embodiments, the telemetry data may further include state information regarding the vehicle itself, such as its location, velocity, acceleration, or the like.

At step 815, as detailed above, the device may form an array of roaming thresholds, based on the telemetry data. In various embodiments, the device may do so by applying regression, such as multivariable regression, to the telemetry data for each of the vehicles taken at different times at the same location.

At step 820, the device may compute an optimum roaming threshold from the array of roaming thresholds, as described in greater detail above. In some embodiments, the device may do so by first determining whether a positive correlation exists between the array of roaming thresholds and an array of packet error rates associated with the location. If such a correlation exists, the device may then compute the eigenvalues of the array of roaming thresholds and determine the optimum roaming threshold as the mean of the eigenvalues.

At step 825, as detailed above, the device may compute an optimum roaming threshold from the array of wireless roaming thresholds to be used by the vehicles when approaching the location. In some embodiments, the device may do so by determining first whether the array is positively correlated with an array of packet error rates associated with the location. If so, the device may compute the optimum roaming threshold as the mean of the eigenvalues of the array of wireless roaming thresholds.

At step 830, the device may trigger one or more of the autonomous vehicles to initiate access point roaming when approaching the particular location, based on the computed optimum threshold, as described in greater detail above. In some embodiments, the device may do so by comparing telemetry data for the one or more autonomous vehicles, to determine that the corresponding telemetry has crossed the optimum threshold (e.g., an RSSI-based threshold). If so, the device may send a roaming instruction to the vehicle(s), such as an 801.11v roaming trigger. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for better characterization of the RF statistics in a wireless network, as well as the state of a vehicle, to better make roaming decisions in real time. In further aspects, the techniques herein are also adaptive and can dynamically adjust the threshold, as needed, without manual intervention by a network administrator. Further, based on the derived optimum threshold, mathematical derivation can be done based on the EIRP Formula and RSSI for relative comparison as to which parent access point should send the roaming instruction to the client, so that the client comes within the adaptive roaming threshold.

While there have been shown and described illustrative embodiments for a triggering client roaming in a wireless network, it is to be understood that various other adaptations and modifications may be made within the intent and scope of the embodiments herein. For example, while the techniques herein are described primarily with respect to the network infrastructure performing the techniques herein, the techniques are not limited as such and can be implemented on any device or client, as desired. Further, while certain protocols are used herein for illustrative purposes, such as 802.11v, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   receiving, at a device in a wireless network, telemetry data from a plurality of autonomous vehicles, wherein the telemetry data is indicative of radio signal quality metrics experienced by the vehicles at a particular location over time;
   forming, by the device, an array of wireless roaming thresholds by applying regression to the telemetry data for each of the vehicles;
   computing, by the device, an optimum roaming threshold from the array of wireless roaming thresholds to be used by the vehicles when approaching the location; and
   triggering, by the device and based on the computed optimum threshold, one or more of the autonomous vehicles to initiate access point roaming when approaching the particular location.

2. The method as in claim 1, wherein the telemetry data is indicative of at least one of: a velocity or acceleration of the autonomous vehicle.

3. The method as in claim 1, wherein the telemetry data comprises at least one of: a packet error rate (PER), a received signal strength indicator (RSSI), or signal to noise ratio (SNR).

4. The method as in claim 1, wherein computing the optimum roaming threshold from the array of wireless roaming thresholds comprises:
   forming, based on the telemetry data, an array of packet error rates; and
   determining whether there is a positive correlation between the array of wireless roaming thresholds and the array of packet error rates.

5. The method as in claim 4, wherein computing the optimum roaming threshold comprises:
   computing eigenvalues of the array of wireless roaming thresholds, when there is a positive correlation between the array of wireless roaming thresholds and the array of packet error rates; and
   determining the optimum roaming threshold as a mean of the eigenvalues.

6. The method as in claim 1, wherein triggering one or more of the autonomous vehicles to initiate access point roaming when approaching the particular location comprises:
   sending an 802.11 basics service set (BSS) transition request to an autonomous vehicle, based on the optimum roaming threshold.

7. The method as in claim 1, wherein one or more of the autonomous vehicles comprise a wireless access point bridge for a controller area network bus (CAN Bus).

8. The method as in claim 1, wherein one or more of the autonomous vehicles comprises a mining truck or cart.

9. The method as in claim 1, further comprising:
   adaptively updating the optimum roaming threshold over time.

10. An apparatus, comprising:
    one or more network interfaces to communicate with a wireless network;
    a processor coupled to the network interfaces and configured to execute one or more processes; and
    a memory configured to store a process executable by the processor, the process when executed configured to:
    receive telemetry data from a plurality of autonomous vehicles, wherein the telemetry data is indicative of radio signal quality metrics experienced by the vehicles at a particular location over time;
    form an array of wireless roaming thresholds by applying regression to the telemetry data for each of the vehicles;
    compute an optimum roaming threshold from the array of wireless roaming thresholds to be used by the vehicles when approaching the location; and
    trigger, based on the computed optimum threshold, one or more of the autonomous vehicles to initiate access point roaming when approaching the particular location.

11. The apparatus as in claim 10, wherein the telemetry data is indicative of at least one of: a velocity or acceleration of the autonomous vehicle.

12. The apparatus as in claim 10, wherein the telemetry data comprises at least one of: a packet error rate (PER), a received signal strength indicator (RSSI), or signal to noise ratio (SNR).

13. The apparatus as in claim 10, wherein the apparatus computes the optimum roaming threshold from the array of wireless roaming thresholds by:
    forming, based on the telemetry data, an array of packet error rates; and
    determining whether there is a positive correlation between the array of wireless roaming thresholds and the array of packet error rates.

14. The apparatus as in claim 13, wherein the apparatus computes the optimum roaming threshold by:
    computing eigenvalues of the array of wireless roaming thresholds, when there is a positive correlation between the array of wireless roaming thresholds and the array of packet error rates; and
    determining the optimum roaming threshold as a mean of the eigenvalues.

15. The apparatus as in claim 10, wherein the apparatus triggers one or more of the autonomous vehicles to initiate access point roaming when approaching the particular location by:
    sending an 802.11 basics service set (BSS) transition request to an autonomous vehicle, based on the optimum roaming threshold.

16. The apparatus as in claim 10, wherein one or more of the autonomous vehicles comprise a wireless access point bridge for a controller area network bus (CAN Bus).

17. The apparatus as in claim 10, wherein one or more of the autonomous vehicles comprises a mining truck or cart.

18. The apparatus as in claim 10, wherein the process when executed is further configured to:
  adaptively update the optimum roaming threshold over time.

19. A tangible, non-transitory, computer-readable medium storing program instructions that cause a device in a wireless network to execute a process comprising:
  receiving, at the device in the wireless network, telemetry data from a plurality of autonomous vehicles, wherein the telemetry data is indicative of radio signal quality metrics experienced by the vehicles at a particular location over time;
  forming, by the device, an array of wireless roaming thresholds by applying regression to the telemetry data for each of the vehicles;
  computing, by the device, an optimum roaming threshold from the array of wireless roaming thresholds to be used by the vehicles when approaching the location; and
  triggering, by the device and based on the computed optimum threshold, one or more of the autonomous vehicles to initiate access point roaming when approaching the particular location.

20. The computer-readable medium as in claim 19, wherein the telemetry data is indicative of at least one of: a velocity or acceleration of the autonomous vehicle.

* * * * *

UNITED STATES PATENT AND TRADEMARK OFFICE
CERTIFICATE OF CORRECTION

PATENT NO. : 10,904,805 B1
APPLICATION NO. : 16/659630
DATED : January 26, 2021
INVENTOR(S) : Akram Ismail Sheriff et al.

Page 1 of 1

It is certified that error appears in the above-identified patent and that said Letters Patent is hereby corrected as shown below:

In the Specification

Column 13, Line 13, please amend as shown:
thereof. Accordingly, this description is to be taken only by Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*